(12) United States Patent
Chen et al.

(10) Patent No.: US 10,282,457 B1
(45) Date of Patent: May 7, 2019

(54) DISTRIBUTED TRANSACTIONS ACROSS MULTIPLE CONSENSUS GROUPS

(71) Applicant: Amazon Technologies, Inc., Seattle, WA (US)

(72) Inventors: Tao Chen, Sammamish, WA (US);
Divya Ashok Kumar Jain, Bellevue, WA (US); Fan Ping, Kenmore, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 15/016,192

(22) Filed: Feb. 4, 2016

(51) Int. Cl.
*G06F 7/00* (2006.01)
*G06F 17/00* (2006.01)
*G06F 17/30* (2006.01)

(52) U.S. Cl.
CPC .............................. *G06F 17/30578* (2013.01)

(58) Field of Classification Search
None
See application file for complete search history.

(56) References Cited

U.S. PATENT DOCUMENTS

| | | | |
|---|---|---|---|
| 7,797,457 B2 | 9/2010 | Lamport | |
| 7,849,223 B2 | 12/2010 | Malkhi et al. | |
| 7,937,482 B1* | 5/2011 | Vermeulen | G06F 11/1425 709/229 |
| 9,569,253 B1* | 2/2017 | Hsieh | G06F 9/466 |
| 9,760,529 B1* | 9/2017 | Ho | G06F 15/177 |
| 9,852,221 B1* | 12/2017 | Callau | H04L 67/10 |
| 2004/0143572 A1* | 7/2004 | McGeachie | G06F 17/30557 |
| 2004/0143595 A1* | 7/2004 | Cherkasova | H04L 67/1095 |
| 2007/0198573 A1* | 8/2007 | Samson | G06N 99/005 |
| 2012/0197868 A1* | 8/2012 | Fauser | G06F 17/30286 707/714 |
| 2013/0064135 A1* | 3/2013 | Matoba | H04L 67/125 370/254 |

(Continued)

OTHER PUBLICATIONS

Leslie Lamport, "The Part-Time Parliament", ACM Transactions on Computer Systems, May 1998, pp. 133-169.

(Continued)

*Primary Examiner* — Binh V Ho
(74) *Attorney, Agent, or Firm* — Robert C. Kowert; Meyertons, Hood, Kivlin, Kowert & Goetzel, P.C.

(57) ABSTRACT

Methods, systems, and computer-readable media for distributed transactions across multiple consensus groups are disclosed. A distributed transaction system comprises a proposer and a plurality of consensus groups, including a first consensus group comprising a first plurality of members and a second consensus group comprising a second plurality of members. The proposer proposes a transaction to at least a portion of the first consensus group and at least a portion of the second consensus group. A majority of the members in the first consensus group agree to perform the transaction, where the transaction is selected from a plurality of proposed transactions involving the first consensus group. A majority of the members in the second consensus group also agree to perform the transaction. The members of the first and second consensus groups perform the transaction to update a plurality of stored replicas.

20 Claims, 14 Drawing Sheets

(56) References Cited

U.S. PATENT DOCUMENTS

| | | | |
|---|---|---|---|
| 2013/0110774 A1* | 5/2013 | Shah | G06F 11/1474 707/610 |
| 2013/0110781 A1* | 5/2013 | Golab | G06F 17/30581 707/638 |
| 2014/0279855 A1* | 9/2014 | Tan | G06F 17/30345 707/609 |
| 2015/0172412 A1* | 6/2015 | Escriva | G06F 17/30091 709/202 |
| 2015/0324444 A1* | 11/2015 | Chercoles Sanchez | G06F 17/30545 707/703 |
| 2017/0177277 A1* | 6/2017 | Laden | G06F 3/0659 |

OTHER PUBLICATIONS

Leslie Lamport, "Generalized Consensus and Paxos", Microsoft Reasearch Technical Report MSR-TR-2005-33, Mar. 2004, pp. 1-59.

Leslie Lamport, "Fast Paxos", Microsoft Research Technical Report MSR-TR-2005-112, Jul. 14, 2005, pp. 1-40.

Leslie Lamport, "Leaderless Byzantine Paxos," Distributed Computing: 25th International Symposium: DISC 2011, Sep. 2011, pp. 141-142.

* cited by examiner

DISTRIBUTED TRANSACTIONS ACROSS MULTIPLE CONSENSUS GROUPS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. When customers access such facilities remotely, the facilities may be said to reside "in the cloud" and may represent cloud computing resources.

As the scale and scope of distributed systems have increased, the tasks of managing and configuring the resources have become increasingly complicated. For example, distributed systems may be used to implement distributed transactions. A distributed transaction may include one or more operations with a termination condition, where the operations are performed on multiple resources that are distributed across different systems or locations. A common example of a distributed transaction is a database transaction in which the state of the database is sought to be replicated across different systems. It is desirable for a database transaction to have the properties of atomicity, consistency, isolation, and durability (i.e., "ACID"), where atomicity guarantees all-or-nothing outcomes across all distributed resources for a unit of work. A typical approach to achieving the atomicity property in a distributed environment is a two-phase commit protocol. However, the two-phase commit protocol requires the use of a centralized manager to coordinate tasks; if the centralized manager fails, the current transaction may not terminate properly and the distributed resources may be unable to progress towards the next transaction. Additionally, some implementations of the two-phase commit protocol do not guarantee serializable isolation among transactions.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-accessible media for distributed transactions across multiple consensus groups are described. Using the techniques described herein, distributed transactions may be performed across multiple consensus groups in a manner that achieves the properties of atomicity, consistency, isolation, and durability. Requests to perform transactions are sent from proposers to members of multiple consensus groups. A set of one or more consensus groups may form a transaction group for a particular transaction. Proposers and members of consensus groups may implement a consensus protocol that permits them to agree on transactions without the use of a centralized coordinator external to the proposers and group members. The consensus protocol may represent an extension of the core Paxos protocol for distributed transactions. In one embodiment, a transaction is chosen and performed if each and every group involved in the transaction reaches a consensus within the group (e.g., a majority of the members of the group agree). Additional techniques may be used to reconcile the acceptance of transaction proposals that vary in the scope of the consensus groups that the proposals involve.

Figure 1:
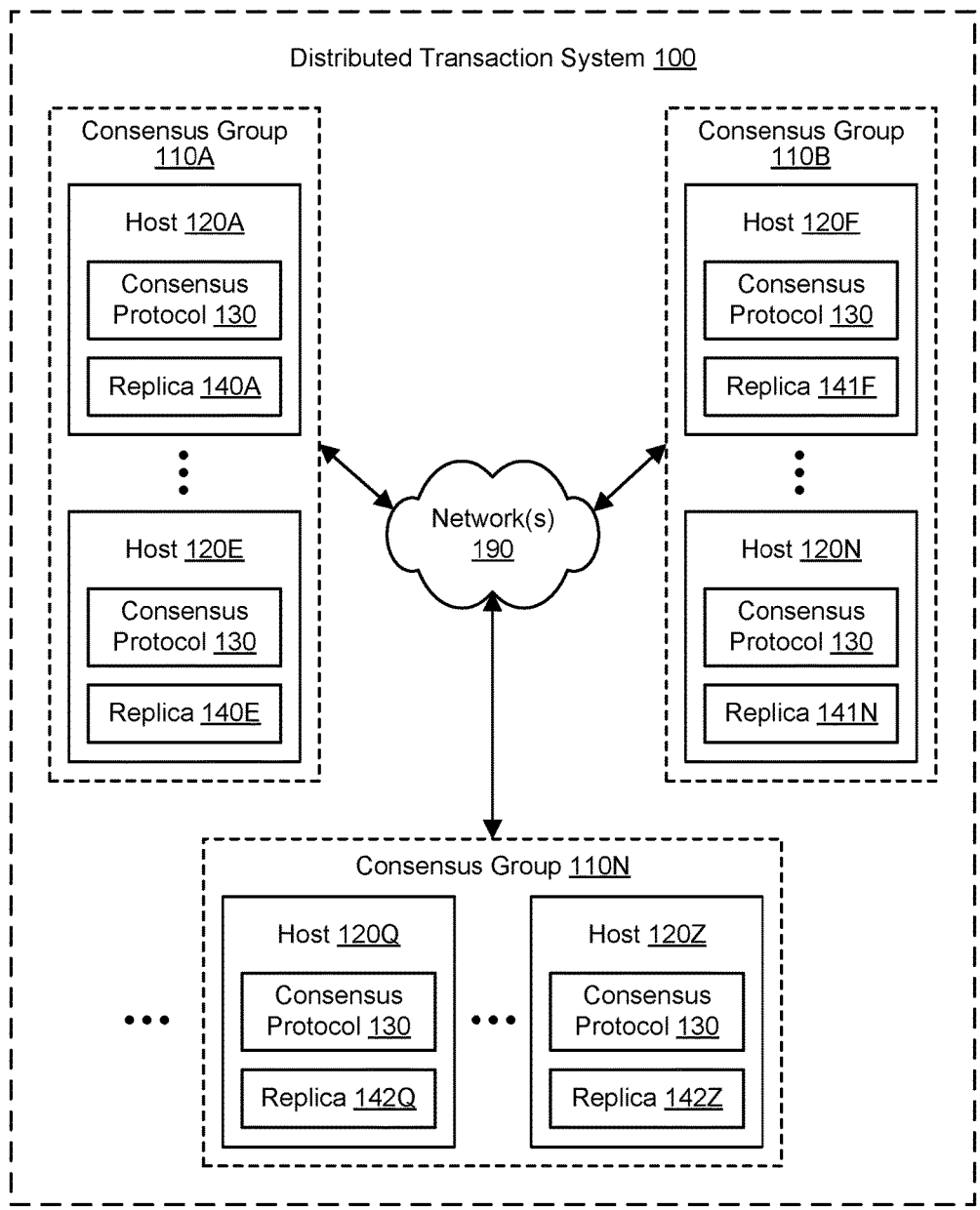
FIG. 1 illustrates an example system environment for distributed transactions across multiple consensus groups, according to some embodiments.

FIG. 1 illustrates an example system environment for distributed transactions across multiple consensus groups, according to some embodiments. A distributed transaction system 100 may include a plurality of consensus groups, and each of the consensus groups may include a plurality of hosts. As shown in FIG. 1, for example, the distributed transaction system may include consensus groups 120A and 120B through 120N. Consensus group 120A may include a plurality of hosts, e.g., hosts 120A through 120E. Consensus group 120B may include a plurality of hosts, e.g., hosts 120F through 120N. Consensus group 120N may include a plurality of hosts, e.g., hosts 120Q through 120Z. It is contemplated that the distributed transaction system 100 may include any suitable number of consensus groups and any suitable number of hosts within any particular group. The distributed transaction system 100 may be implemented using one or more computing devices, any of which may be implemented by the example computing device 2000 illustrated in FIG. 13. In various embodiments, portions of the functionality of the distributed transaction system 100 (e.g., multiple hosts) may be provided by the same computing device or by any suitable number of different computing devices. In one embodiment, a host may represent a set of one or more processes configured for communicating with other hosts and for performing transactions. If any of the components of the distributed transaction system 100 are implemented using different computing devices, then the components and their respective computing devices may be communicatively coupled, e.g., via one or more networks 190. Each of the illustrated components may represent any combination of software and hardware usable to perform their respective functions. It is contemplated that the distributed transaction system 100 may include additional components not shown, fewer components than shown, or different combinations, configurations, or quantities of the components shown.

The hosts may also be referred to as distributed hosts, the consensus groups may also be referred to as groups or replication groups, and the set of groups may also be referred to as a mesh. A host within a group may be referred to as a member of that particular group. In some implementations, the mesh may include thousands of groups. Each group may store a plurality of replicas of a resource, such as a database resource (e.g., a partition) or a storage resource (e.g., a volume in a block-based storage system). A replica may represent client data or metadata about client data, potentially including volume data and/or volume metadata. Typically, each host in a group may store one replica. As shown in the example of FIG. 1, the hosts 120A-120E within consensus group 110A may store replicas 140A-140E, respectively; the hosts 120F-120N within consensus group 110B may store replicas 141F-141N, respectively; and the hosts 120Q-120Z within consensus group 110N may store replicas 142Q-142Z, respectively. The replicas may be maintained in any suitable type of storage, such as persistent storage managed locally by a host or accessible by the host over a network. In the distributed transaction system 100, different consensus groups may be dedicated to storing and maintaining different types of data. For example, the replicas 140A-140E may differ from the replicas 141F-141N and 142Q-142Z in the nature of the data or in the portion of a larger data set that they represent. Distributed transactions performed in the distributed transaction system 100 may store or update a replicated resource (as managed by the hosts) within one or more of the consensus groups.

The hosts themselves may experience failures or otherwise become unresponsive, or communication between one host and another host may experience a failure. The distributed transaction system 100 may seek to achieve the properties of atomicity, consistency, isolation, and durability (i.e., "ACID") for individual transactions, even in an environment where failures of individual hosts may occur. Even if some hosts fail or become unresponsive, the distributed transaction system 100 may also allow progress to occur (e.g., to move from one transaction to the next).

Each of the hosts in the distributed transaction system 100 may implement a consensus protocol 130. The consensus protocol 130 may be used by the hosts to agree on one transaction to be performed by one or more of the consensus groups. Different transactions may involve different combinations of the groups, from one of the groups to two of the groups to potentially all of the groups. For a transaction to be chosen and performed, a majority of the hosts in each of the groups involved in the transaction may use the consensus protocol 130 to agree to the transaction. For example, if a transaction is proposed to group A and group B, then a majority of the hosts within group A may be required to agree to the transaction before it can proceed, and likewise a majority of the hosts within group B may be required to agree to the transaction before it can proceed; the transaction will not be chosen if it is not accepted by a majority of the hosts in group A or a majority of the hosts in group B (or by a majority of A and a majority of B). If a second transaction is proposed to group B but not to group A during the same round, then group B may be expected to choose one of the two transactions; if a majority of the hosts in group B choose the second transaction over the first transaction, then the first transaction may fail to proceed even though group A was not involved in the second transaction.

The consensus protocol 130 may guarantee that, within a group, only a transaction that has been proposed may be chosen. The consensus protocol 130 may also guarantee that, within a group, only a single transaction is chosen for any given round. Additionally, the consensus protocol 130 may guarantee that a process never learns that a transaction has been chosen unless it actually has been chosen. Furthermore, the consensus protocol 130 may guarantee that a transaction is not chosen unless it is chosen by all the groups involved in the transaction. A group is involved in a transaction if the proposer of the transaction attempts to propose the transaction to at least one member of the group.

In one embodiment, the consensus protocol 130 may comprise an extended version of a protocol from the Paxos family of protocols. Using the techniques described herein, the distributed transaction system 100 may extend the Paxos protocol from one consensus group to many consensus groups while ensuring the properties of atomicity, consistency, isolation, and durability. The distributed transaction system 100 may do so without the use of a centralized manager component (e.g., external to the hosts) for coordinating the activities of the hosts or monitoring the state of distributed transactions. Any of the distributed hosts may be configured to perform tasks such as proposing a transaction (e.g., to act as a proposer), accepting a proposed transaction (e.g., to act as an acceptor), or performing tasks (e.g., storage tasks or database tasks) required to complete a transaction.

In a typical, single-group Paxos implementation, the first phase of a transaction may include the following steps: (a) a proposer selects a proposal number n and sends a prepare request with that number n to a majority of acceptors within a group; and (b) if an acceptor receives a prepare request with number n greater than that of any prepare request to which it has already responded, then it responds to the request with a promise not to accept any more proposals numbered less than n and with the highest-numbered proposal (if any) that it has accepted. In a typical, single-group Paxos implementation, the second phase of a transaction may then include the following steps:
(a) if the proposer receives a response to its prepare requests (numbered n) from a majority of acceptors, then it sends an accept request to each of those acceptors for a proposal numbered n with a value v, where v is the value of the highest-numbered proposal among the responses, or is any value if the responses reported no proposals; and
(b) if an acceptor receives an accept request for a proposal numbered n, it accepts the proposal unless it has already responded to a prepare request having a number greater than n. To learn that a value (e.g., a transaction) has been chosen, a learner must find out that a proposal has been accepted by a majority of acceptors. Each acceptor, whenever it accepts a proposal, may respond to all learners by sending them the proposal. A value that is accepted by majority can be learned as chosen and may not change or get lost.

From the perspective of a group in a typical, single-group Paxos implementation, as long as no majority has accepted a value while in the proposing state, any value can be accepted by any member of the group. But once majority of the group has accepted a value, no new values can be proposed and accepted by any member of the group. From the perspective of a value in a typical, single-group Paxos implementation, any value that is proposed in the group in a proposal can be either committed or aborted. Once the proposed value is accepted by majority of the group, it is ensured to be committed and cannot be aborted. On the other hand, if a proposed value is only accepted by minority and is not able to be accepted by majority (i.e., the majority has accepted other value), it is ensured to be aborted (i.e., its value will not be learned/committed by anyone in the group). Once a majority of acceptors have accepted a same value, no other values can be accepted by majority; the group is locked by a value accepted by the majority. Once a majority of acceptors have accepted a same value with number n, then n is the highest number known to the group; the group can only be locked by the highest numbered value. The learning may ensure the termination: once a value is accepted by the majority of acceptors, that value can be learned as chosen; once the group is locked, it is ensured to be committed and terminated.

The distributed transaction system 100 may extend such a single-group Paxos protocol to a multi-group consensus protocol 130 that may be implemented by the hosts in the plurality of consensus groups 110A-110N. As used herein, the term "round" may refer to the life cycle of a consensus on choosing one value or update. As used herein, the term "group" or "consensus group" may refer to a group of processes that run the consensus protocol 130. Each member of the group may hold one replica of the data that the group is responsible for storing. If P is such a group, then P={N1, N2, N3, . . . }, where N1, N2, N3, . . . are the members of the group P. As used herein, the term "transaction group" may be a group of groups. A transaction group may define the scope of each transaction. If G is a transaction group, then G={P1, P2, P3, . . . }, where P1, P2, P3, . . . are groups. As used herein, the term "transaction" refers to one or more updates to the data hosted by a transaction group. In one embodiment, the updates in the transaction must be either all committed or all aborted to preserve the property of atomicity. If T is a transaction, then T(G) is a transaction that has updates in the scope of transaction group G.

The distributed transaction system 100 may be implemented with the assumption that each group member is aware of all members of the group. The distributed transaction system 100 may also be implemented with the assumption that a proposer knows all members of all groups for a transaction that it is trying to propose. Additionally, the distributed transaction system 100 may be implemented with the assumption that membership of each group does not change during a round.

Figure 2:
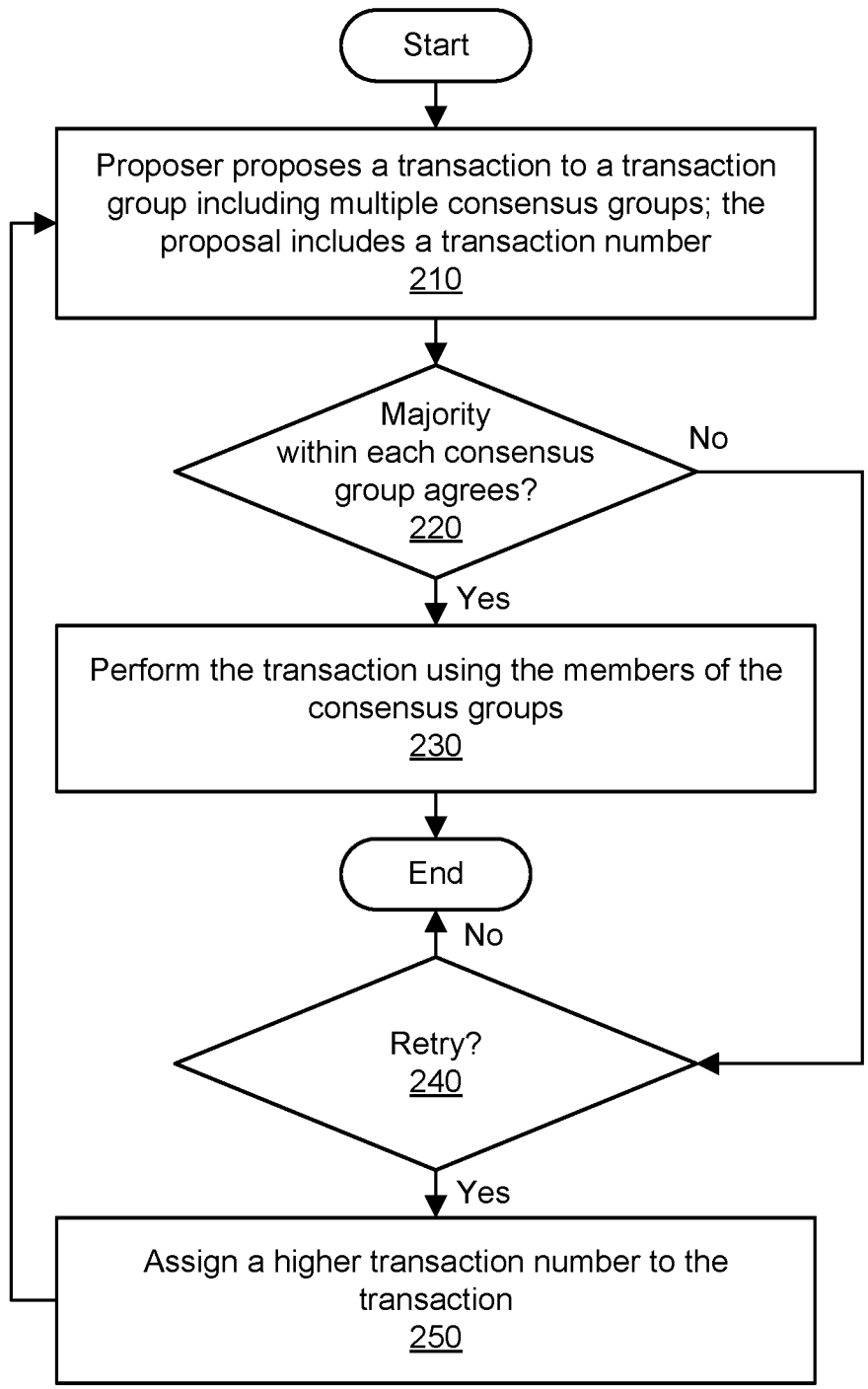
FIG. 2 is a flowchart illustrating a method for distributed transactions across multiple consensus groups, according to some embodiments.

FIG. 2 is a flowchart illustrating a method for distributed transactions across multiple consensus groups, according to some embodiments. The method may be performed in a distributed transaction system comprising a proposer and a plurality of consensus groups, such as a first consensus group comprising a first plurality of members and a second consensus group comprising a second plurality of members. As shown in 210, the proposer may propose a transaction to at least a portion of the first consensus group and at least a portion of the second consensus group. The transaction may be proposed by sending (e.g., according to the consensus protocol) a prepare-transaction request that includes a description of the transaction itself (e.g., the data to be updated, one or more operations to be performed, one or more values to update, and so on). The prepare-transaction request may include a transaction number (e.g., uniquely identifying the transaction across all consensus groups in the distributed transaction system). In one embodiment, the transaction numbers may globally increase across the distributed transaction system over time, at least within a window of time before the numbers may be reset occasionally. The prepare-transaction request may also include data identifying the members of the consensus groups to which the request is directed. Any suitable identifying data, such as IP (Internet Protocol) addresses, may be used.

As shown in 220, it may be determined whether a majority within each and every consensus group agrees to the proposal. For example, if the proposal was issued to a first consensus group and a second consensus group, then a majority of the hosts within the first consensus group and a majority of the hosts within the second consensus group must agree to perform the transaction. In one embodiment, one or more of the consensus groups may select the transaction from a plurality of proposed transactions involving that consensus group. The transaction is selected from the proposed transactions involving the same consensus group based (at least in part) on the transaction number for the transaction being higher than the respective transaction numbers for additional transactions in the plurality of proposed transactions. A member will typically return a positive response to a prepare-transaction request unless the member has accepted a higher-numbered transaction, in which case the consensus protocol 130 permits the member to ignore and not respond to the prepare-transaction request for the lower-numbered transaction. The agreement by the majority of the members in the consensus groups may be determined based (at least in part) on positive responses to the prepare-transaction request sent by the members to the proposer. The members of the consensus groups that respond positively to the prepare-transaction request may be referred to as acceptors of that request.

If the majority within every group agrees, then as shown in 230, the transaction may be performed using the members of the consensus groups within the scope of the transaction (e.g., the first consensus group and the second consensus group). In one embodiment, once the majority is determined using the prepare-transaction request and its responses, the proposer may send an accept-transaction request to the acceptors of the proposal; the transaction may be performed by the acceptors based (at least in part) on receipt of the accept-transaction request. Members other than acceptors within a group may learn of the transaction selected by the majority using any suitable technique so that all the members may update their respective replicas. Performing the transaction may include updating a plurality of stored replicas associated with the members of the groups. If the majority cannot be achieved within any of the groups to which the proposal is directed, then as shown in 240, the proposal may be deemed to have failed during the current round, and the proposer may determine whether to retry the proposal. If a retry is desired, then as shown in 250, the proposer may assign a higher number to the transaction and again propose the transaction as shown in 210.

Figure 3A:
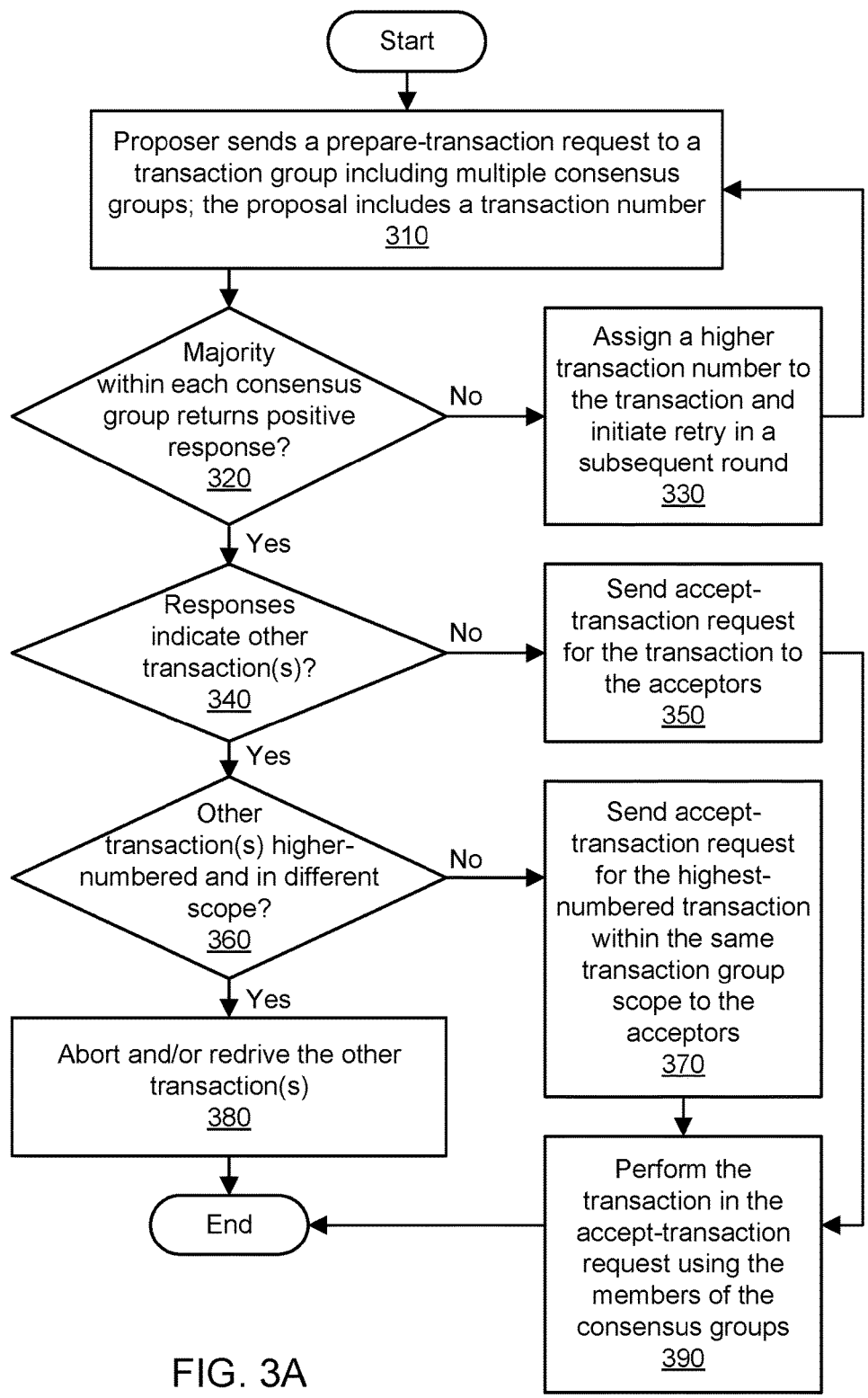
FIG. 3A and FIG. 3B are flowcharts illustrating methods for distributed transactions across multiple consensus groups, according to some embodiments.

FIG. 3A is a flowchart illustrating further details of the method for distributed transactions across multiple consensus groups, according to some embodiments. For a particular transaction, the consensus protocol 130 may enable a method that includes a prepare phase and an accept phase, where the prepare phase occurs before the accept phase for the particular transaction. In one embodiment, in step (a) of the prepare phase, as shown in 310, a proposer selects a proposal number n and sends a prepare-transaction request with number n and transaction T(G) to a majority of acceptors of each group in the transaction group G. The distributed transaction system 100 may include a suitable mechanism, such as a synchronization protocol or highly available external number generation service, that is usable by the hosts to determine transaction numbers in order to act as proposers of transactions, such that the transaction numbers used across different hosts and different consensus groups may increase with time and not conflict. In one embodiment, in step (b) of the prepare phase, if an acceptor receives a prepare-transaction request with number n greater than that of any prepare request to which it has already responded, then it responds to the request with a promise not to accept any more transaction proposals numbered less than n and with the highest-numbered transaction T (if any) that it has accepted.

In one embodiment, in step (a) of the accept phase, as shown in 320, if the proposer receives a response to its prepare-transaction requests (numbered n) from a majority of acceptors of each group in the transaction group G, then steps (a.1) and (a.2) of the accept phase may be performed. If the proposer fails to receive a response from the majority of each group in the transaction group G, then as shown in 330, the prepare phase may be retried for the transaction with a higher proposal number than n. In one embodiment, in step (a.1) of the accept phase, as shown in 340 and 350, if the response does not report back any transaction, then the proposer sends an accept-transaction request to each of those acceptors with the original transaction T. In one embodiment, in step (a.2) of the accept phase, as shown in 340 and 360, if the response reported back with one or more accepted transactions, then the proposer picks the highest-numbered transaction among the responses for each group in G. For example, if the transactions responded back from each group in G={P1, P2, P3} are, P1: {$T_n$, $T_{n-1}$}, P2: {$T_{n-1}$}, P3: {$T_{n-2}$, $T_{n-3}$} then the proposer may pick $T_n$ from group P1, $T_{n-1}$ from group P2, and $T_{n-2}$ from group P3. The proposer may then take the actions for steps (a.2.1) and (a.2.2) of the accept phase.

The scope associated with a transaction includes the particular consensus groups involved in the transaction, and the scopes may thus vary from transaction to transaction. In one embodiment, in step (a.2.1) of the accept phase, as shown in 360 and 370, if the highest numbered transactions reported in each group (e.g., $T_n$, $T_{n-1}$, and $T_{n-2}$ from groups P1, P2, and P3, respectively) all refer to the same transaction group (e.g., the transaction groups for $T_n$, $T_{n-1}$, and $T_{n-2}$ are all the same as G={P1, P2, P3}), then the proposer sends an accept-transaction request to each of those acceptors for a proposal numbered n with highest-numbered transaction T' in response (e.g., $T_n$ from group P1). In one embodiment, in step (a.2.2) of the accept phase, as shown in 360 and 380, if the highest numbered transactions reported in each group (e.g., $T_n$, $T_{n-1}$, and $T_{n-2}$ from groups P1, P2, and P3, respectively) do not all refer to the same transaction group (e.g., $T_n$(G1), $T_{n-1}$(G2), $T_{n-2}$ (G3) from P1, P2, and P3 respectively, where G1=G={P1, P2, P3}, G2={P2}!=G, and G3={P3, P4}!=G), then the proposer knows that some other transaction (e.g., $T_{n-2}$ (G3)) that involves a different transaction group (e.g., G3={P3,P4})) may have been chosen by some group (e.g., P3) that is also part of the transaction group G for T that it is proposing (e.g., P3 in G={P1, P2, P3}). Accordingly, the proposer may never be able to get all the groups in the transaction group to choose its proposal. The proposer may, for all groups that have returned a transaction that is in the scope of transaction group G, send an abort-transaction request with transaction group G (e.g., send abort-transaction(G) to P1 to abort $T_n$(G1)). The proposer may, for all groups that have returned a transaction that is out of the scope of transaction group G, redrive the transaction by attempting to restart from the prepare phase, e.g., for $T_{n-1}$(G2), $T_{n-2}$ (G3).

In one embodiment, in step (b) of the accept phase, if an acceptor receives an accept-transaction request for a transaction proposal numbered n, it accepts the proposed transaction unless it has already responded to a prepare request having a number greater than n. As shown in 390, the transaction may be performed using the members of the consensus groups within the scope of the transaction. In one embodiment, in step (c) of the accept phase, if an acceptor receives an abort-transaction request for a proposal numbered n with transaction group G, it aborts any lower-numbered transaction proposal that is in scope G and is accepted.

Members other than acceptors within a group may learn of the transaction selected by the majority so that all the members may update their respective replicas. In one embodiment, any suitable technique may be used for each member of a group to learn which transaction has been chosen by the group. A transaction T in scope G is considered chosen and thus can be committed if and only if every group $P_i$ in the scope of the transaction group G has chosen the transaction T. In one embodiment, the proposer may send a "committed" or "decided" message to all acceptors once it receives the accept-transaction acknowledgement response from majority of all groups in the scope. Then each member of each group can commit the decided transactions independently.

Figure 3B:
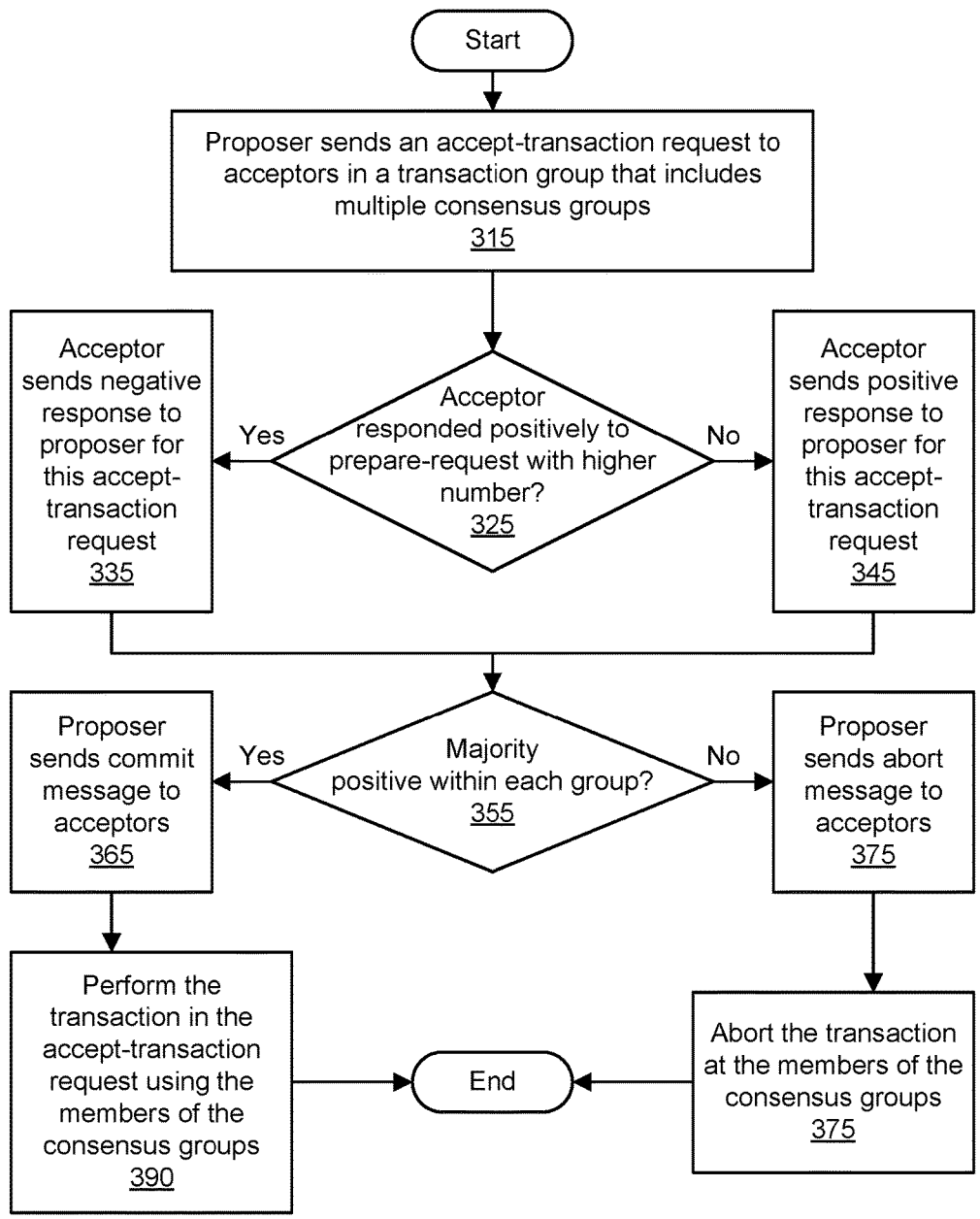

FIG. 3B is a flowchart illustrating further details of the accept phase in the method for distributed transactions across multiple consensus groups, according to some embodiments. As discussed above, if the proposer receives a response to its prepare-transaction requests (numbered n) from a majority of acceptors of each group in the transaction group G, then as shown in 315, the proposer may send an accept-transaction request to the acceptors. In one embodiment, if the response did not report back any (or any other) transaction, then the proposer may send an accept-transaction request to each of those acceptors with the original transaction T. In one embodiment, if the response reported back with one or more accepted transactions, then the proposer may analyze the scopes of the transactions and pick the highest-numbered transaction among the responses for each group in G that is also within the same scope as T. For example, if the highest numbered transactions reported in each group (e.g., $T_n$, $T_{n-1}$, and $T_{n-2}$ from groups P1, P2, and P3, respectively) all refer to the same transaction group (e.g., the transaction groups for $T_n$, $T_{n-1}$, and $T_{n-2}$ are all the same as G={P1, P2, P3}), then the proposer may send an accept-transaction request to each of those acceptors for a proposal numbered n with highest-numbered transaction T' in response (e.g., $T_n$ from group P1).

As shown in 325, each acceptor, upon receipt of the accept-transaction request, determines whether the acceptor has already responded positively to a prepare request having a greater transaction number than the transaction in the accept-transaction request. If so, then as shown in 335, the acceptor may send a negative response to the proposer for the accept-transaction request. If not, then as shown in 345, the acceptor may send a positive response to the proposer for the accept-transaction request.

As shown in 355, the proposer may determine whether a majority of each of the consensus groups has responded positively to the accept-transaction request. If so, then as shown in 365, the proposer may send a "committed" or "decided" message to the consensus groups within the scope of the transaction (e.g., to the acceptors) so that the members of the groups can perform the transaction as shown in 390. Members other than acceptors within a group may learn of the transaction selected by the majority so that all the members may update their respective replicas. In one embodiment, any suitable technique may be used for each member of a group to learn which transaction has been chosen by the group.

If a majority of any of the consensus groups did not respond positively to the accept-transaction request, then as shown in 375, the proposer may send an abort-transaction request to the consensus groups within the scope of the transaction (e.g., to the acceptors). As shown in 385, each acceptor, upon receipt of the abort-transaction request, may abort the transaction that was previously accepted for this round. In one embodiment, when an acceptor receives an abort-transaction request for a proposal numbered n with transaction group G, it aborts any lower-numbered transaction proposal that is in scope G and is accepted.

Figure 4:
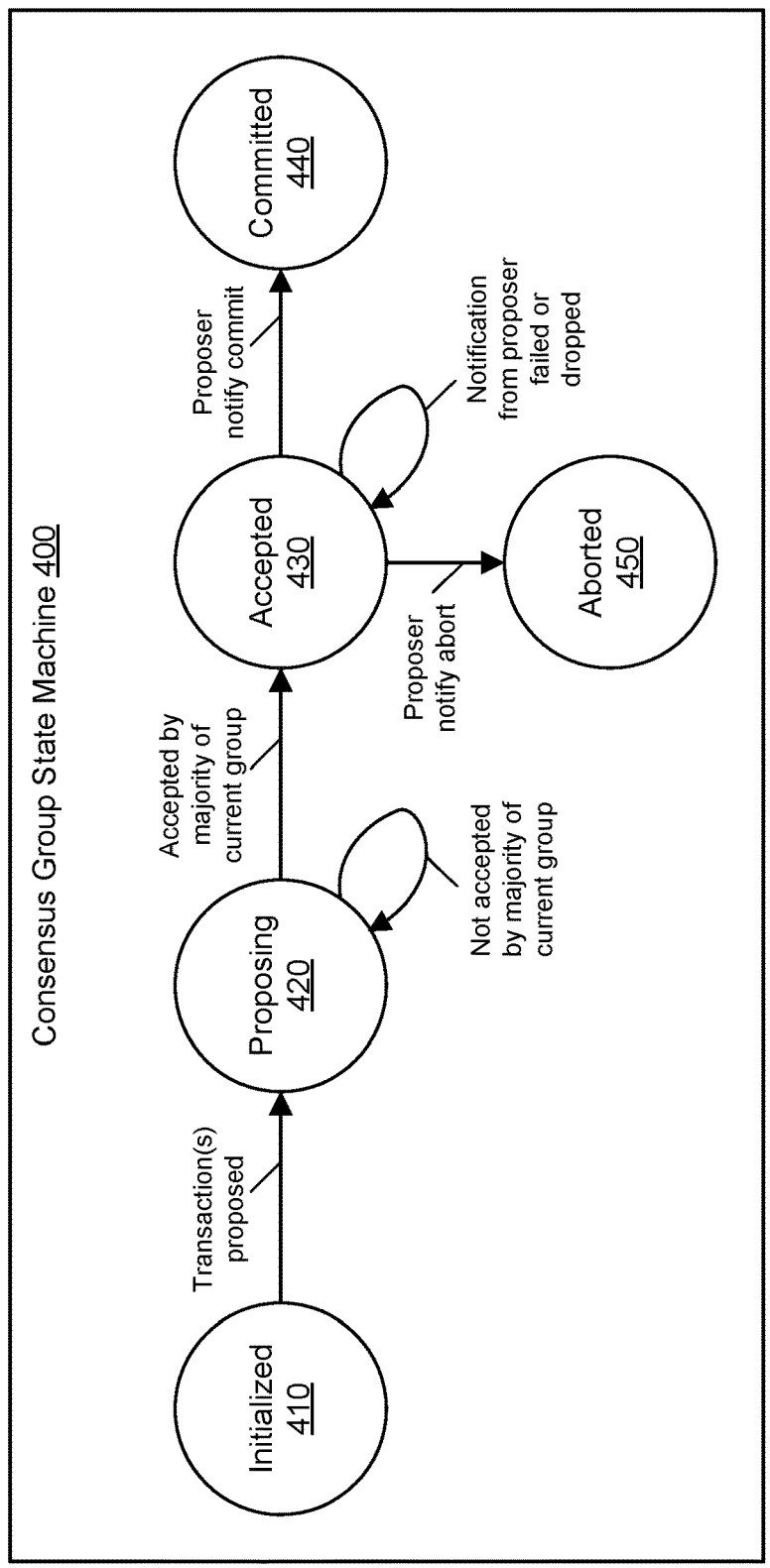
FIG. 4 illustrates a state machine for a consensus group, according to some embodiments.

FIG. 4 illustrates a state machine for a consensus group, according to some embodiments. The state machine indicates the states of a consensus group and the transitions between those states during a round. There can be multiple transactions, or even multiple transactions with different scope (i.e., transaction group), proposed in this round. From an initialized state 410, the group may transition to a proposing state 420 when one or more transactions are proposed by one or more proposers (typically external to the group). From the proposing state 420, the group may transition to an accepted state 430 for a particular transaction if the corresponding proposal is accepted by the majority of members of the group. However, the group may stay in the proposing state 420 if the proposal is not accepted by a majority of the group. From the accepted state 430, the group may transition to a committed state 440 for the particular transaction if the proposer notifies the group to commit the transaction. From the accepted state 430, the group may transition to an aborted state 450 for the particular transaction if the proposer notifies the group to abort the transaction. The group may stay in the accepted state 430 if a commit or abort notification from the proposer fails or is lost in transit. In one embodiment, the outcome may be that one of the transactions is accepted by the majority within the consensus group and enters a committed or aborted state. The consensus protocol 130 may differ from the original Paxos protocol in that acceptance by majority does not necessarily mean that the transaction is chosen and thus that it can be learned by others within the group.

Figure 5:
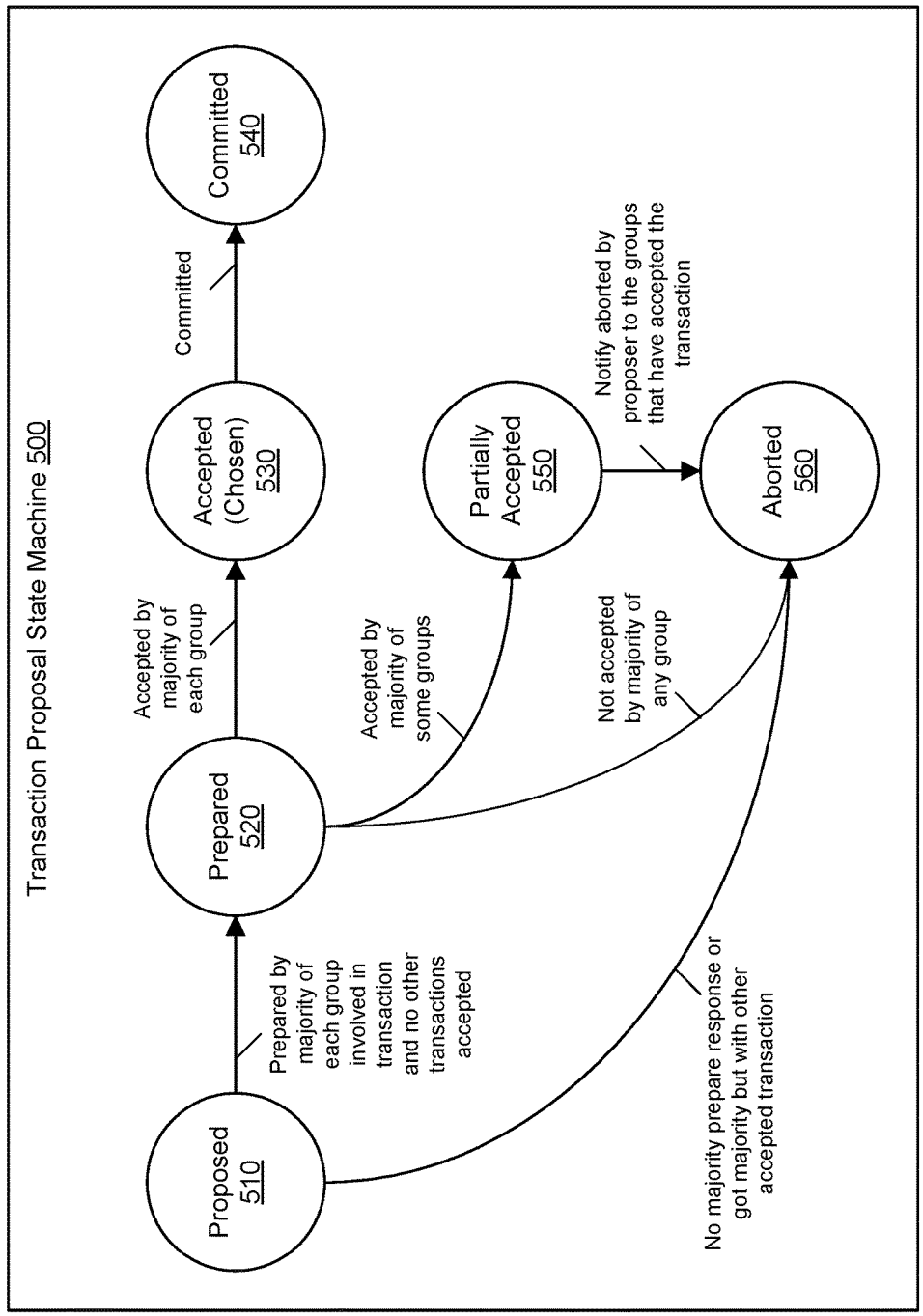
FIG. 5 illustrates a state machine for a transaction proposal, according to some embodiments.

FIG. 5 illustrates a state machine for a transaction proposal, according to some embodiments. The state machine indicates the states of a proposal and the transitions between those states during a round. From a proposed state 510, the transaction may transition to a prepared state 520 if the transaction is prepared by a majority of each group involved in the transaction (e.g., by a positive response to a prepare-transaction request) and if no other transactions are accepted by those groups. From the proposed state 510, the transaction may transition to an aborted state 560 if a positive response is not received from a majority of any of the consensus groups in the scope of the transaction or if a majority was achieved but the responses referenced one of more other transactions (e.g., with higher transaction numbers). From the prepared state 520, the transaction may transition to an accepted (chosen) state 530 if the transaction is accepted by the majority of each group (e.g., by a positive response to an accept-transaction request). From the prepared state 520, the transaction may transition to a partially accepted state 550 if the proposal is accepted by a majority of some (but not all) of the consensus groups in the scope of the transaction. From the partially accepted state 550, the transaction may transition to the aborted state 560 if an abort request is sent by the proposer to the groups that accepted the proposed transaction. From the prepared state 520, the transaction may also transition to the aborted state 560 if the transaction is not accepted by the majority within any of the consensus groups in the scope of the transaction. From the accepted state 530, the transaction may transition to a committed state 540 when committed by the members of the consensus groups within the scope of the transaction. The consensus protocol 130 may differ from the original Paxos protocol in that it can enter a state which is partially accepted by some but not all consensus groups in the scope of the transaction. In one embodiment, such a state of partial acceptance leads to abortion of the transaction.

In one embodiment, the consensus protocol 130 may include safety and termination invariants. Once a majority of acceptors in a consensus group have accepted the same transaction, then no other transactions may be accepted by majority, such that the group is locked by a transaction accepted by majority. Once a majority of acceptors in a consensus group have accepted the same transaction with transaction number n, then n represents the highest transaction number known to the group; that the group can only be locked by the highest numbered value it encounters in the current round. Because a proposed transaction includes a scope of one or more consensus groups, one consensus group may be locked by having the majority accept some transaction that is not chosen throughout the entire scope. However, the abort-transaction request may be used to unlock such a consensus group. Thus the consensus protocol 130 may include a termination invariant that, if a majority of acceptors in a consensus group have accepted the same transaction, then that transaction can be aborted or can be learned as chosen by other members of the group.

FIG. 6 through FIG. 11 illustrate examples of preparing, accepting, and aborting distributed transactions across multiple consensus groups, according to some embodiments. Each of FIG. 6 through FIG. 11 follows the same example through multiple points in time in the distributed transaction system 100. The example illustrates the manner in which the consensus protocol 130 handles multiple transaction proposals of differing scope. In the example, the transaction proposals collectively affect three consensus groups 110A, 110B, and 110N. Consensus group 110A includes three members: hosts 120A, 120B, and 120E. Consensus group 110B includes three members: hosts 120F, 120G, and 120N. Consensus group 110N also includes three members: hosts 120Q, 120R, and 120Z.

Figure 6:
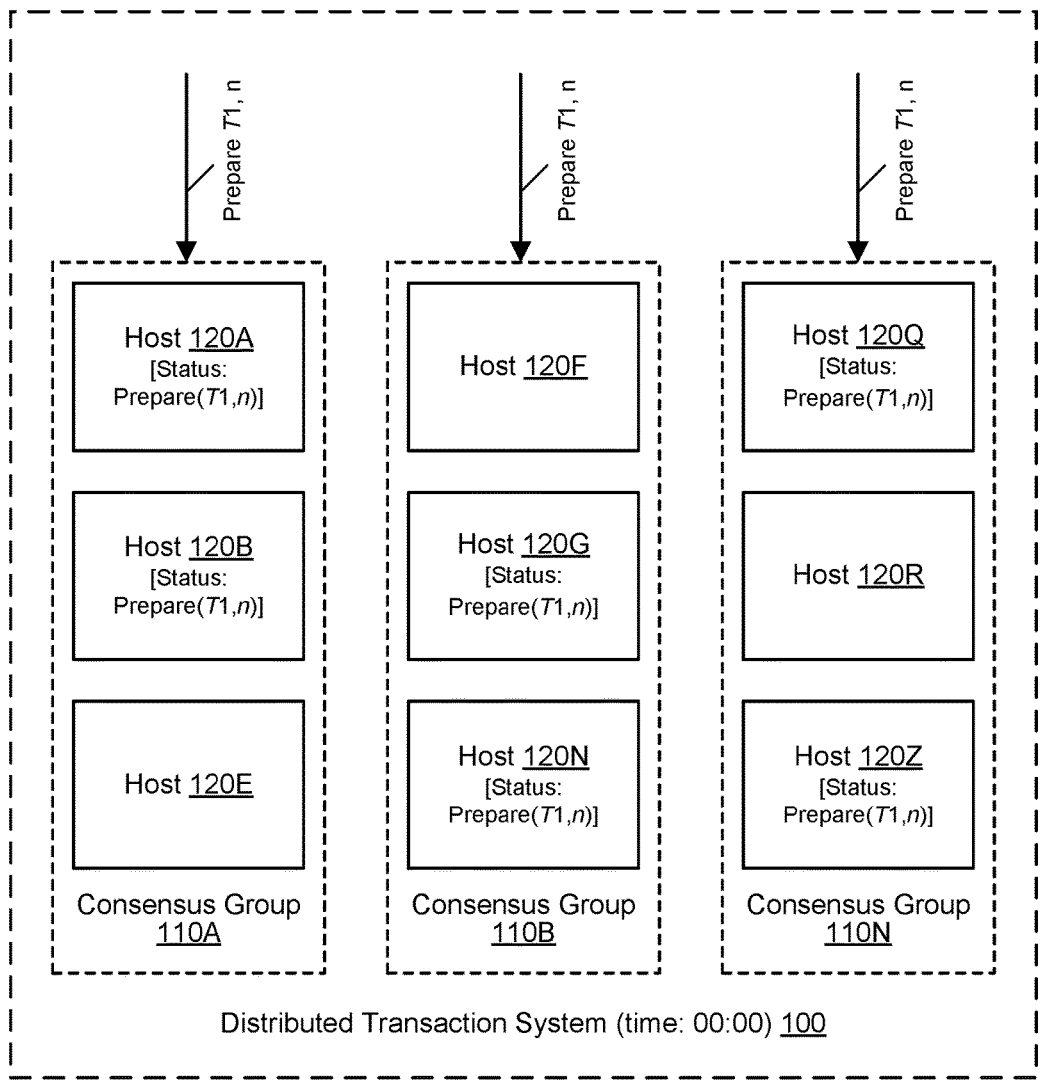
FIG. 6 through FIG. 11 illustrate examples of preparing, accepting, and aborting distributed transactions across multiple consensus groups, according to some embodiments.

FIG. 6 illustrates the example at an initial time of 00:00. A prepare-transaction request for transaction T1 is sent to various members within all three consensus groups 110A, 110B, and 110N. The transaction T1 has a transaction number n. The prepare-transaction request has been received only by hosts 120A, 120B, 120G, 120N, 120Q, and 120Z. All the recipients may respond positively, thus achieving a majority (two out of three) within each of the consensus groups for T1 and causing the prepare-request for T1 to succeed.

Figure 7:
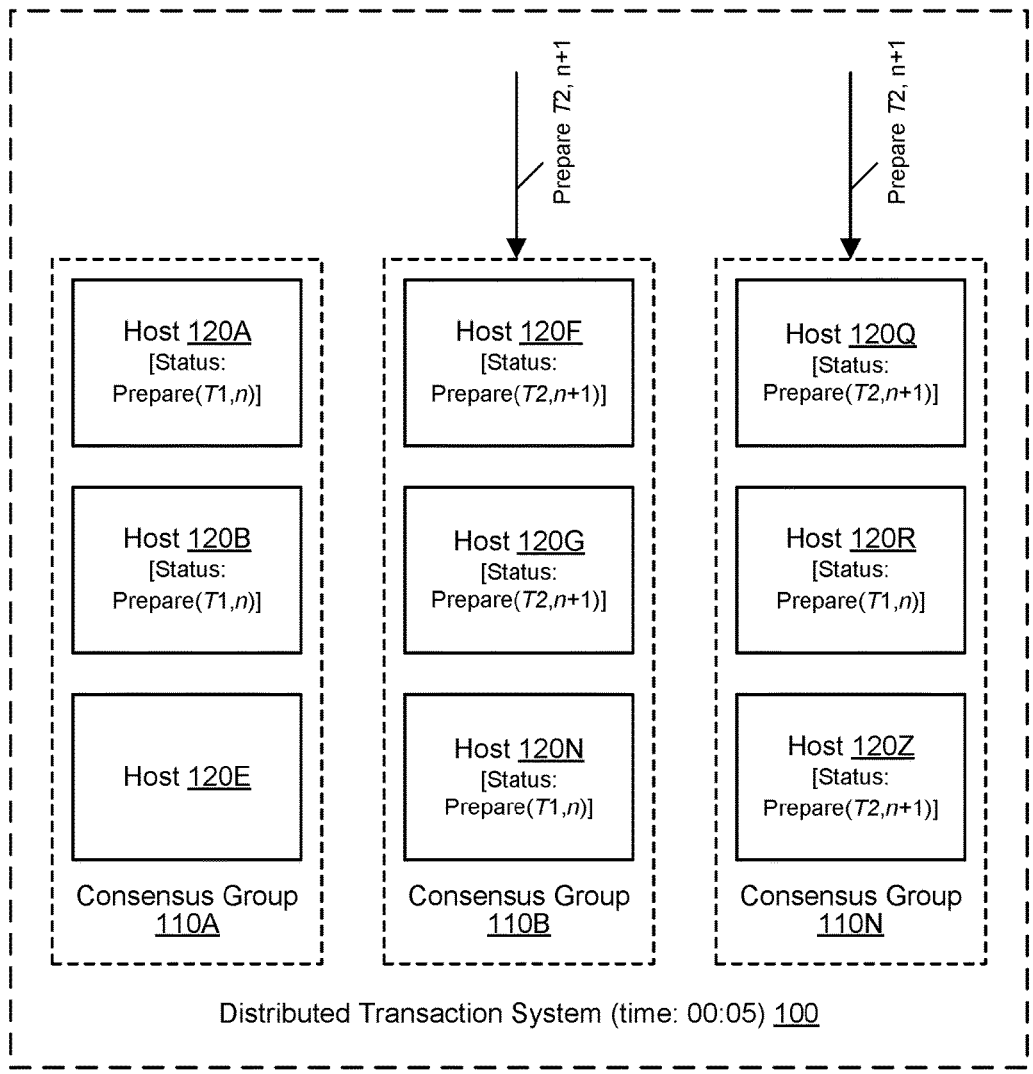

FIG. 7 illustrates the example at a time of 00:05. A prepare-transaction request for transaction T2 is sent to various members within two of the consensus groups 110B and 110N. The transaction T2 has a transaction number n+1 and may be proposed by the same or different proposer as T1. The prepare-transaction request has been received only by hosts 120F, 120G, 120Q, and 120Z. Because the transaction number is higher for T2 than for T1, all the recipients may respond positively, thus achieving a majority (two out of three) within each of the consensus groups for T2 and causing the prepare-request for T2 to succeed. The acceptance of the prepare-transaction request for T2 guarantees that the acceptors will not prepare another transaction lower than n+1.

Figure 8:
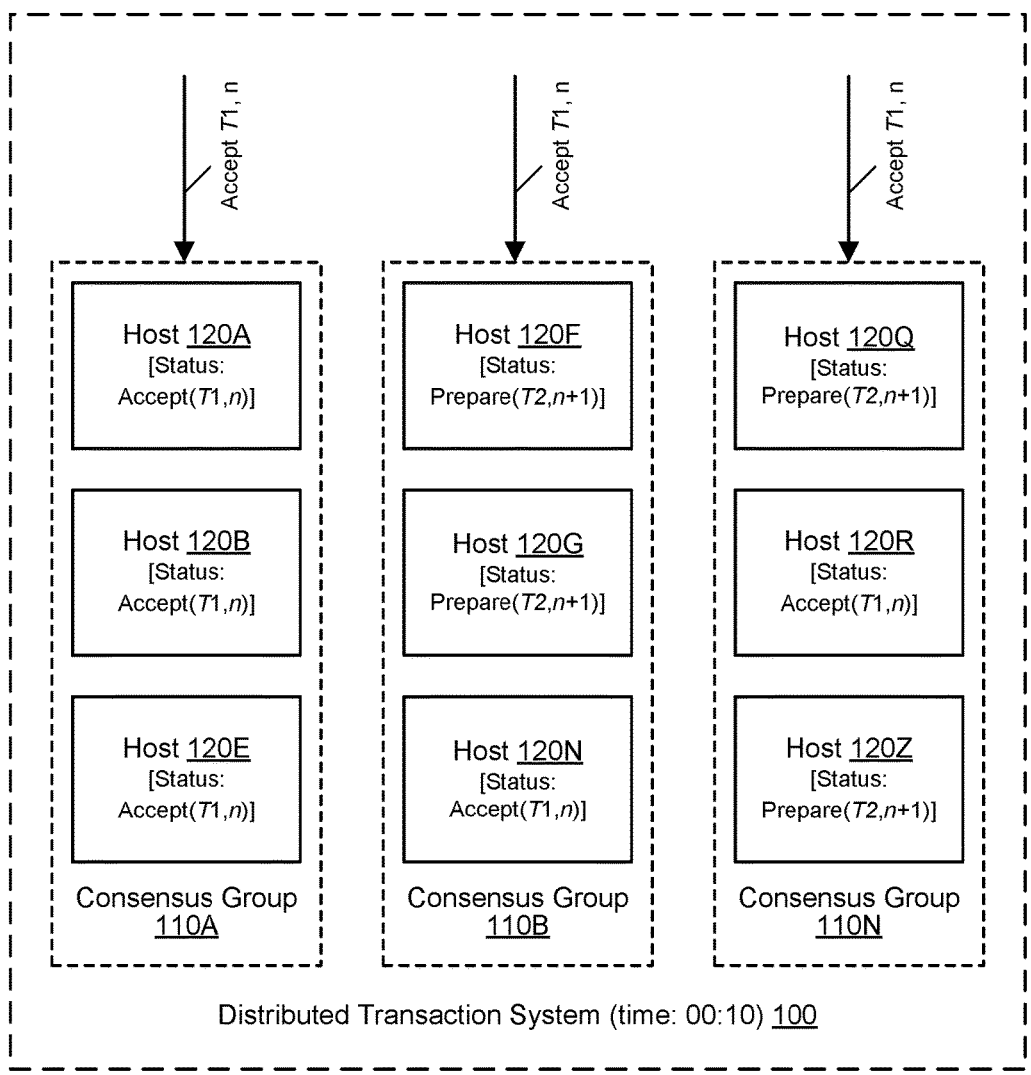

FIG. 8 illustrates the example at a time of 00:10. An accept-transaction request for transaction T1 is sent to various members within all three consensus groups 110A, 110B, and 100N. Because hosts 120F, 120G, 120Q, and 120Z have previously prepared a higher-numbered transaction, only hosts 120A, 120B, 120E, 120N, and 120R may respond positively for the prepare-transaction request for T1. In the example, the prepare-transaction request for T1 achieves a majority within group 110A but not within group 110B or 110N; the partial acceptance leads to the failure of the prepare-transaction request for T1. At this point, the proposer of T1 may attempt to abort T1, but in this example, the abort-transaction request is never sent by the proposer or never received by consensus group 110A.

Figure 9:
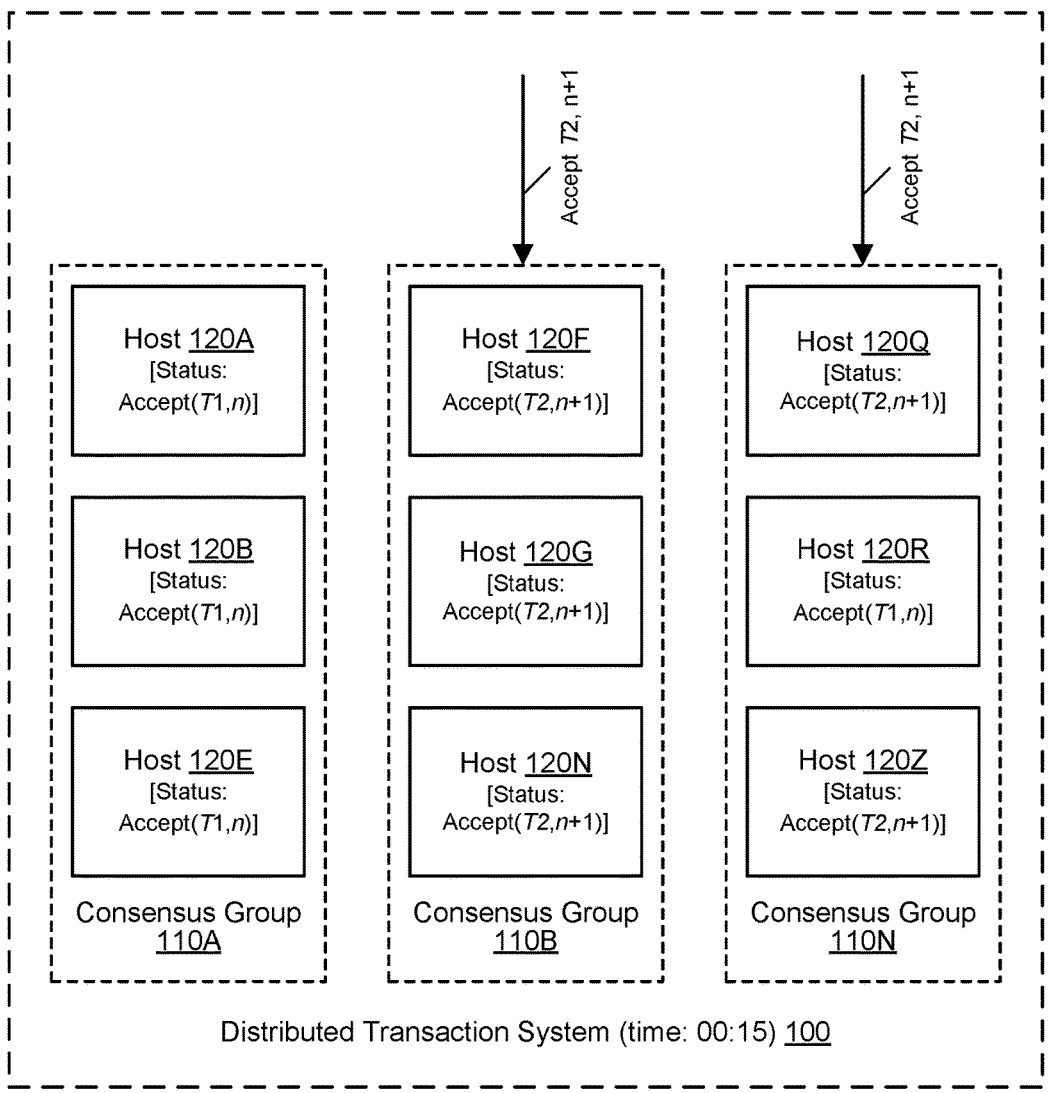

FIG. 9 illustrates the example at a time of 00:15. An accept-transaction request for transaction T2 is sent to various members within the two consensus groups 110B and 110N. Hosts 120F, 120G, 120N, 120Q, and 120Z may respond positively for the prepare-transaction request for T2. Host 120N may accept the accept-transaction request for transaction T2 because it has a higher transaction number than T1. Host 120R does not receive the accept-transaction request for transaction T2 and thus maintains its status of acceptance for T1. In the example, the prepare-transaction request for T2 achieves a majority within group 110B and also within group 110N. Thus the prepare-transaction request for T2 succeeds.

Figure 10:
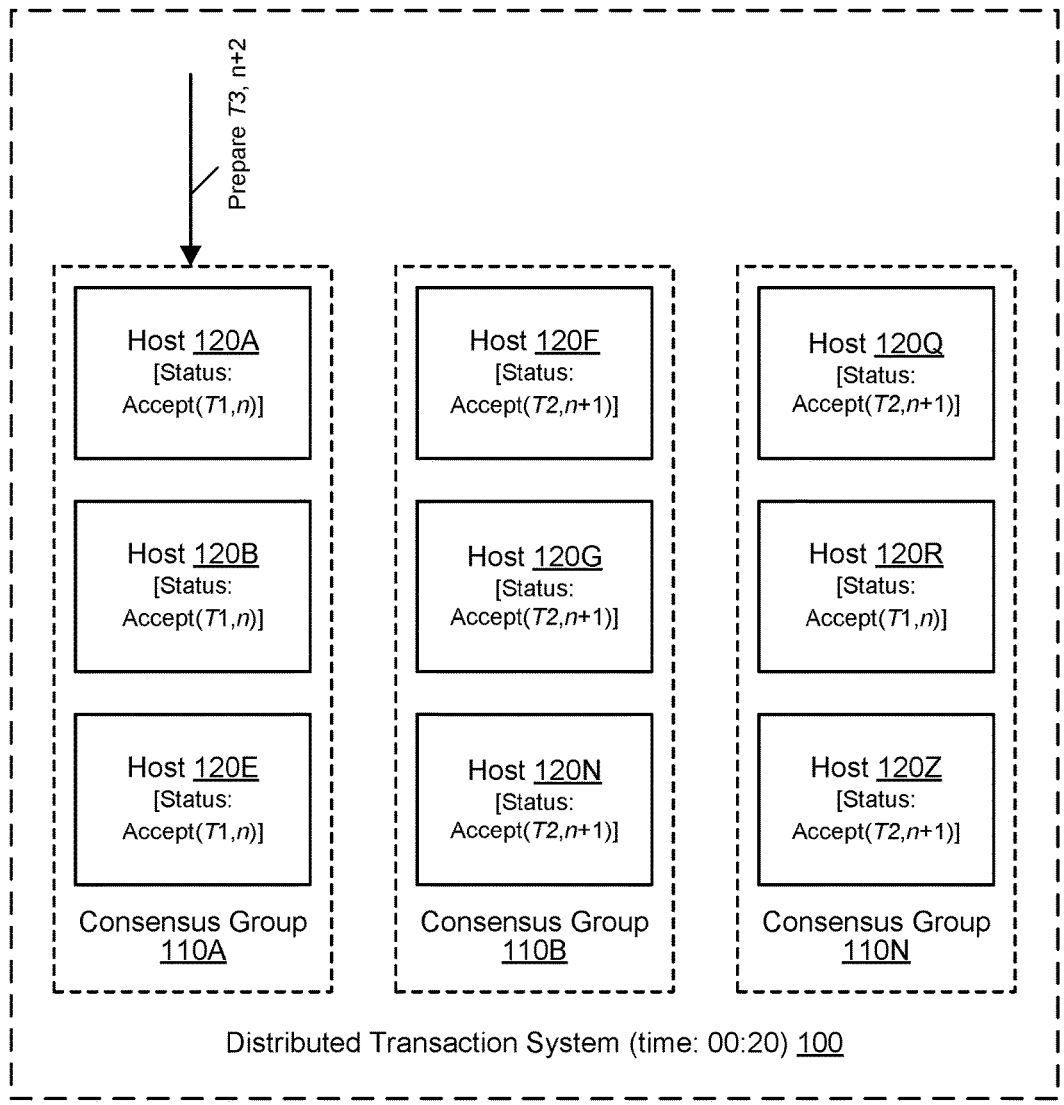

FIG. 10 illustrates the example at a time of 00:20. A prepare-transaction request for concurrent transaction T3 (with transaction number n+2) is sent to various members within consensus group 110A. The proposer of T3 may be the same or different as the proposers of T1 or T2. Because the majority of the group has already accepted T1, the prepare-transaction request for transaction T3 fails. Based on the consensus protocol 130, the proposer of T3 may receive an indication of the prior acceptance of T1 from consensus group 100A and, since the scope of T1 is different from the scope of T3, trigger a redrive of T1 on the original scope of T1 (consensus groups 110A, 110B, and 110N). In one embodiment, the redrive may be attempted if the scope of the redriven transaction is bigger than the current scope; otherwise, the proposer has sufficient information to decide whether the transaction should be aborted.

Figure 11:
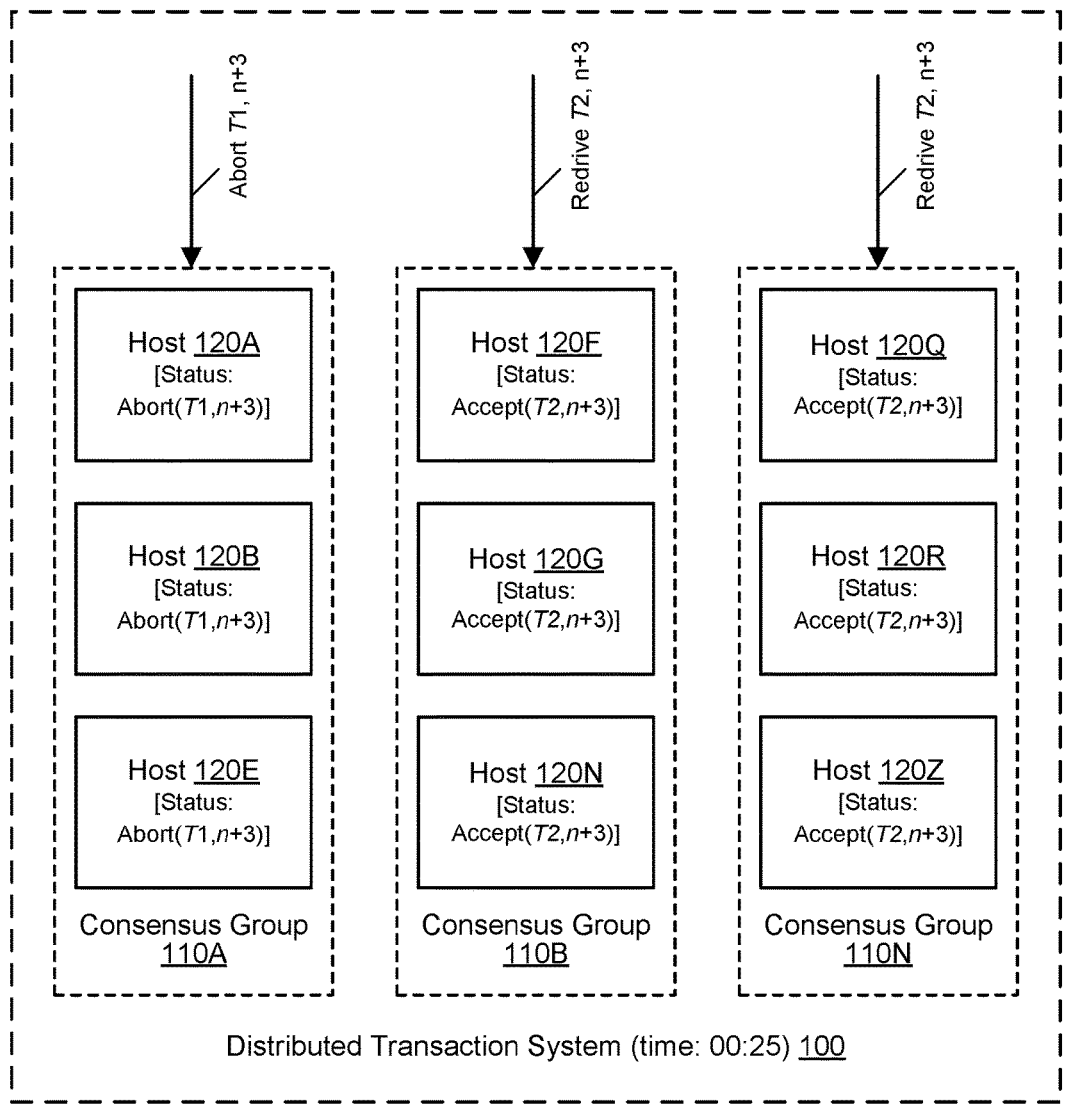

FIG. 11 illustrates the example at a time of 00:25. The proposer of T3 has attempted to redrive T1 with a new transaction number n+3 on consensus groups 110A, 110B, and 100N. The new prepare-transaction request for T1 may get the following responses: T1 is accepted by a majority of consensus group 110A, T2 rather than T1 is accepted by a majority of consensus group 110B, and T2 rather than T1 is also accepted by a majority of consensus group 110N. Upon learning that T1 has failed to achieve a majority within each of its consensus groups, the proposer may then send an abort-transaction request to consensus group 110A. The proposer may also redrive the T2 request for groups 110B and 110N so that minority members of those groups have a chance to learn that T2 was accepted. As a result, group 110A will abort transaction T1 while groups 110B and 110N will maintain their status on transaction T2. Thus T2 is the only transaction that is successfully committed, while T1 and T3 are aborted.

Figure 12:
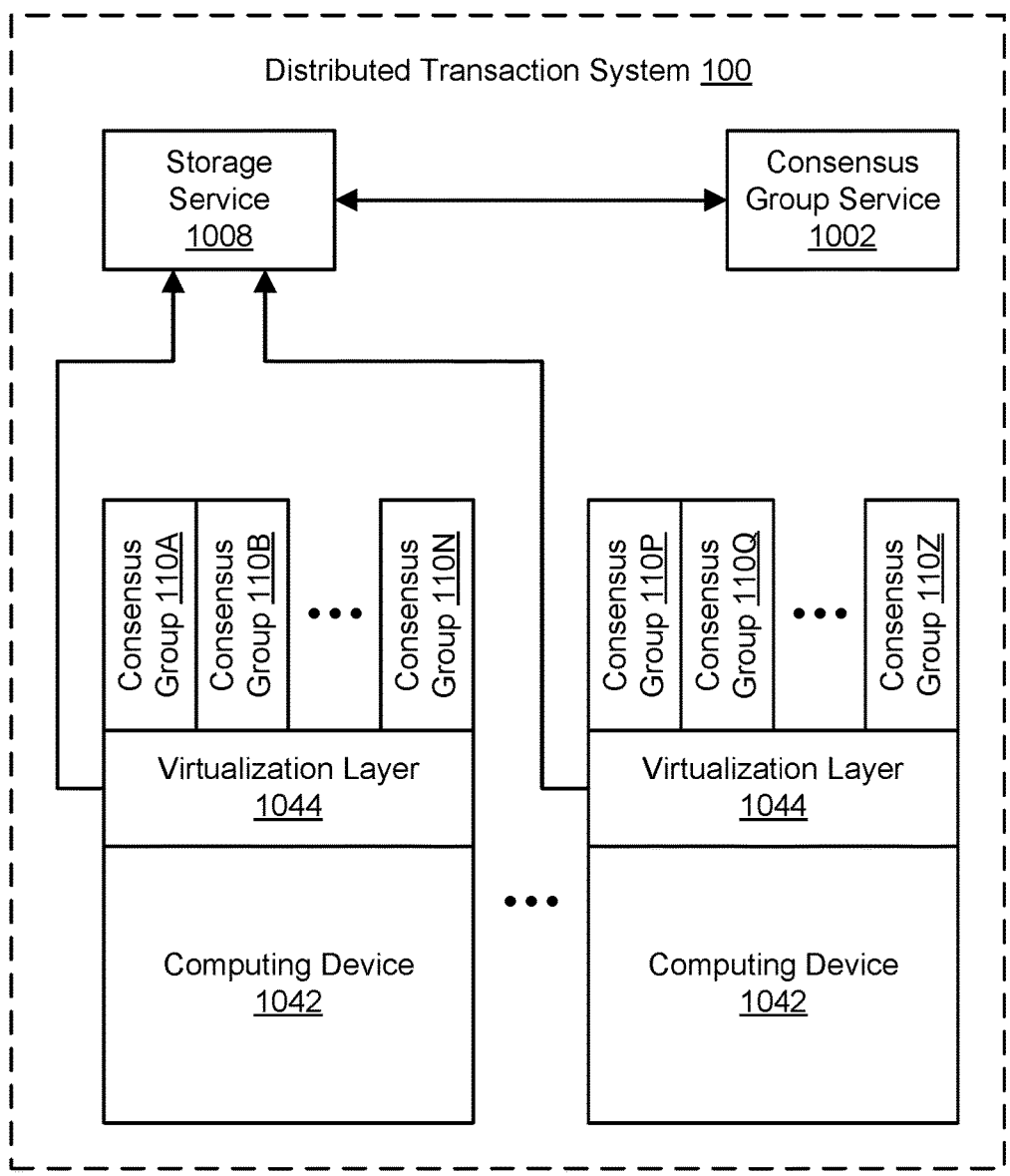
FIG. 12 illustrates further aspects of the distributed transaction system, including a consensus group service, according to some embodiments.

FIG. 12 illustrates further aspects of the distributed transaction system 100, including a consensus group service, according to some embodiments. The consensus group service 1002, may be implemented by physical hardware and may be used in a multi-tenant provider network to provide durable storage resources for customers of the distributed transaction system 100. The consensus group service 1002 may include a group of computing systems, such as the computing devices 1042 (e.g., server computers), configured to manage and provide consensus groups for use by customers of the distributed transaction system 100. The computing devices 1042 may include any device or equipment configured to execute instructions for performing data computation, manipulation, or storage tasks, such as a computer or a server, e.g., as implemented using the example device 2000 shown in FIG. 13. Any suitable number and configuration of computing devices 1042 may be used with the distributed transaction system 100.

A virtualization layer 1044 may include a bare metal hypervisor or a hosted hypervisor. The virtualization layer 1044 executing on the computing devices 1042 may enable the physical hardware to be used to provide computational resources upon which one or more consensus groups (e.g., groups 110A-110N and 110P-110Z) and/or component(s) thereof may operate. For example, the virtualization layer 1044 may enable a particular member of a consensus group to access physical hardware on the server computer 1042 through virtual device drivers or other executable code on the node. The virtualization layer 1044 may include a hypervisor or virtualization software and/or hardware. The virtualization layer 1044 may also include an instance of an operating system dedicated to administering the consensus group or component thereof running on the computing device 1042. Each virtualization layer 1044 may include its own networking software stack which is responsible for communication with other virtualization layers 1044 and, at least in some embodiments, which is also responsible for implementing network connectivity between the consensus group(s) or components thereof running on the computing device 1042 and one or more other consensus groups running on other computing devices 1042.

Furthermore, the computing device 1042 may host multiple virtualization layers 1044 of the same or different types on the same computing device 1042 as well as consensus groups of the same or different types. For example, a server computer system 1042 may host a first node of a first consensus group 110A and may host a second node that is a member of a second consensus group 110B. The virtualization layer 1044 may include any device, software, or firmware used for providing a virtual computing platform and/or virtualized computing resources for the consensus group and/or component thereof. The virtual computing platform may include various virtual computer components, such as one or more virtual CPUs, virtual memory, and the like. A consensus group may be provided to the customers or other service of the distributed transaction system 100, and the customers may store data or other information using the consensus group or component therefor. Further, the distributed transaction system 100 may use one or more of its own consensus groups for supporting execution of its applications and providing storage for such applications.

Commands and other information may be included in an application program interface (API) call from the consensus group service 1002 or a storage service 1008, described in greater detail below, to the virtualization layer 1044. The consensus group service 1002 may enable the customers of the distributed transaction system 100 to manage and operate a consensus group. For example, the client may transmit a request to the consensus group service 1002 to obtain log information corresponding to a particular consensus group 110A. The request may include an API call including information corresponding to the client, the storage service 1008, or the particular consensus group 110A. The consensus group service 1002 may determine the corresponding virtualization layer 1044 for the consensus group 110A included in the request and transmit a command to the virtualization layer 1044 to obtain operation logs stored locally by the consensus group 110A.

A log pusher may be used to obtain logs stored locally by the consensus groups. In various embodiments, the log pusher, may obtain logs from the consensus groups and store the logs in one or more storage devices of a storage service 1008. The log pusher may be a process or other executable code supported by the virtualization layer 1044. The storage service may be a group of computer systems configured to store data that is accessible to one or more other computer systems, such as the consensus group service 1002. In this way, log information maintained by the storage service 1008 may be accessed by the consensus group service 1002 and/or clients. The storage service 1008 may be a data warehouse or a non-queryable data storage system. A data storage system and/or data storage device is queryable if data storage system and/or data storage device enable requestors to submitted data queries and receive response to the submitted data queries. For example, the storage service 1008 may include a database, such as a Structured Query Language (SQL) database, which enables clients to query the storage service 1008 for information contained in the logs and stored by the storage service 1008. In another example, the storage service 1008 may be non-queryable, such that the storage service 1008 stores the log files as data objects which are obtainable by a data object identifier, such as a file name or key, but does enable queries on information contained in the log files.

The consensus group service 1002 may be responsible for processing the logs obtained from the consensus groups. The consensus group service 1002 may include a log collector, described in greater detail below, configured to obtain logs from the storage service 1008. In addition, the log collector may be configured to cause processed logs to be stored by the storage service 1008. For example, the consensus group service 1002 may obtain stored logs from the storage service 1008 and may process the log by at least removing duplicate entries and/or heartbeat or other messages included in the log. The logs may contain duplicate entries as a result of the consensus groups containing a plurality of nodes. The logs may also be processed such that only committed and/or performed operations are maintained in the processed logs (e.g., the processed logs contain only operations performed by the nodes of the consensus groups). These processed logs may in turn be stored by the storage service 1008.

Illustrative System

Figure 13:
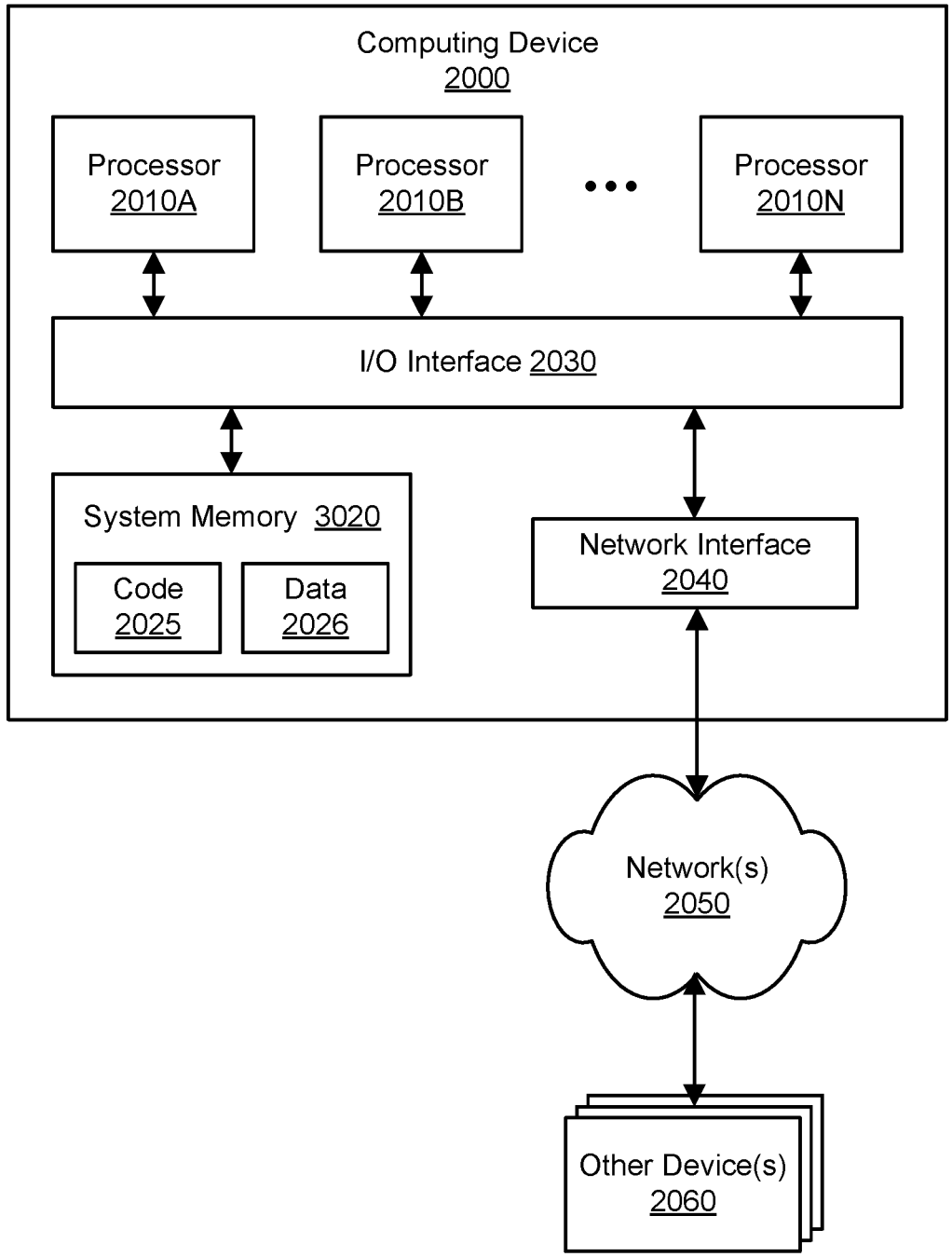
FIG. 13 illustrates an example of a computing device that may be used in some embodiments.

In at least some embodiments, a server that implements some or all of the techniques for managing pools of virtual desktop instances as described herein may include a computer system that includes or is configured to access a non-transitory computer-accessible (e.g., computer-readable) media, such as computer system 2000 illustrated in FIG. 13. For example, in various embodiments, any or all of the computer system components described herein may be implemented using a computer system similar to computer system 2000 that has been configured to provide the functionality of those components. In the illustrated embodiment, computer system 2000 includes one or more processors (e.g., processors 2010A and 2010B through 2010N) coupled to a system memory 2020 via an input/output (I/O) interface 2030. Computer system 2000 further includes one or more network interfaces 2040 coupled to IO interface 2030. In some embodiments, network interfaces 2040 may include two or more network interfaces (including, e.g., one configured for communication between a computing resource hosted on the computer system 2000 and its clients, and one configured for communication between a computing resource and external resources, computing systems, data centers, or Internet destinations).

In various embodiments, computer system 2000 may be a uniprocessor system including one processor or a multiprocessor system including several processors 2010A-2010N (e.g., two, four, eight, or another suitable number). Processors 2010A-2010N may be any suitable processors capable of executing instructions. For example, in various embodiments, processors 2010A-2010N may be processors implementing any of a variety of instruction set architectures (ISAs), such as the x86, PowerPC, SPARC, or MIPS ISAs, or any other suitable ISA. In multiprocessor systems, each of processors 2010A-2010N may commonly, but not necessarily, implement the same ISA.

System memory 2020 may be configured to store instructions and data accessible by processor(s) 2010A-2010N. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 2020 as code 2025 and data 2026.

In one embodiment, I/O interface 2030 may be configured to coordinate I/O traffic between processors 2010A-2010N, system memory 2020, and any peripheral devices in the device, including any of network interface(s) 2040 or other peripheral interfaces. In some embodiments, I/O interface 2030 may perform any necessary protocol, timing or other data transformations to convert data signals from one component (e.g., system memory 2020) into a format suitable for use by another component (e.g., processors 2010A-2010N). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processors 2010A-2010N.

Network interface(s) 2040 may be configured to allow data to be exchanged between computer system 2000 and other devices 2060 attached to a network or networks 2050, such as other computer systems or devices as illustrated in the figures, for example. In various embodiments, network interface(s) 2040 may support communication via any suitable wired or wireless general data networks, such as types of Ethernet network, for example. Additionally, network interface(s) 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for implementing various embodiments of the techniques for managing resources for virtual desktop instances described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 2000 via I/O interface 2030. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface(s) 2040.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing devices configured to implement a distributed transaction system comprising a proposer and a plurality of consensus groups, including a first consensus group comprising a first plurality of members and a second consensus group comprising a second plurality of members, wherein members of the plurality of consensus groups store respective replicas of a same data set, wherein the proposer and the first plurality of members and the second plurality of members implement a consensus protocol, and wherein the distributed transaction system is configured to:
   send, from the proposer to at least a portion of the first consensus group and at least a portion of the second consensus group, a prepare-transaction request for a transaction;
   send, from a majority of the first consensus group and a majority of the second consensus group to the proposer, positive responses to the prepare-transaction request, wherein the majority of the first consensus group and the majority of the second consensus group represent acceptors of the transaction, and wherein the positive responses to the prepare-transaction request do not indicate acceptance of an additional transaction;
   send, from the proposer to the acceptors in the first consensus group and in the second consensus group, an accept-transaction request for the transaction; and
   perform the transaction using the first plurality of members in the first consensus group and the second plurality of members in the second consensus group, wherein the transaction is performed based at least in part on receipt of the accept-transaction request, and wherein a plurality of the stored replicas are updated by the transaction.

2. The system as recited in claim 1, wherein the prepare-transaction request, the positive responses to the prepare-transaction request, and the accept-transaction request are sent using a consensus protocol and without centralized coordination external to the proposer and the first and second consensus groups.

3. The system as recited in claim 1, wherein the transaction is associated with a transaction number, and wherein the transaction is selected from a plurality of proposed transactions involving the first consensus group based at least in part on the transaction number for the transaction being higher than the respective transaction numbers for additional transactions in the plurality of proposed transactions.

4. The system as recited in claim 1, wherein the prepare-transaction request comprises data identifying individual members in the first and second consensus groups to which the prepare-transaction request is sent.

5. A computer-implemented method, comprising:
performing, by a plurality of computing devices that collectively implement a distributed transaction system comprising a proposer and a plurality of consensus groups including a first consensus group comprising a first plurality of members storing respective replicas of a same data set and a second consensus group comprising a second plurality of members storing respective replicas of the same data set:
proposing, by the proposer to at least a portion of the first consensus group and at least a portion of the second consensus group, a transaction;
determining an agreement, by a majority of the members in the first consensus group, to perform the transaction, wherein the transaction is selected from a plurality of proposed transactions involving the first consensus group;
determining an agreement, by a majority of the members in the second consensus group, to perform the transaction; and
performing the transaction using the members of the first consensus group and the members of the second consensus group, wherein a plurality of the stored replicas are updated by the transaction.

6. The method as recited in claim 5, wherein the proposing the transaction, the determining the agreement by the majority of the members in the first consensus group, and the determining the agreement by the majority of the members in the second consensus group are performed using a consensus protocol and without centralized coordination external to the proposer and the first and second consensus groups.

7. The method as recited in claim 5, wherein the transaction is associated with a transaction number, and wherein the transaction is selected from the plurality of proposed transactions involving the first consensus group based at least in part on the transaction number for the transaction being higher than the respective transaction numbers for additional transactions in the plurality of proposed transactions.

8. The method as recited in claim 5,
wherein proposing the transaction comprises sending, from the proposer to at least the portion of the first consensus group and at least the portion of the second consensus group, a prepare-transaction request for the transaction;
wherein the agreement by the majority of the members in the first consensus group is determined based at least in part on positive responses to the prepare-transaction request from the majority of the members in the first consensus group;
wherein the agreement by the majority of the members in the second consensus group is determined based at least in part on positive responses to the prepare-transaction request from the majority of the members in the second consensus group, wherein the majority of the first consensus group and the majority of the second consensus group represent acceptors of the transaction, and wherein the positive responses to the prepare-transaction request from the first consensus group and the second consensus group do not indicate acceptance of an additional transaction; and
wherein the method further comprises:
sending, from the proposer to the acceptors in the first consensus group and in the second consensus group, an accept-transaction request for the transaction, wherein the transaction is performed based at least in part on receipt of the accept-transaction request.

9. The method as recited in claim 5, further comprising:
sending, from a second proposer to at least a portion of a third consensus group and at least a portion of a fourth consensus group, a second prepare-transaction request for a second transaction, wherein the second prepare-transaction request comprises a second transaction number, wherein the third consensus group comprises a third plurality of members and the fourth consensus group comprises a fourth plurality of members, wherein the second proposer and the third plurality of members and the fourth plurality of members implement the consensus protocol;
sending, from a majority of the third consensus group to the second proposer, but not from a majority of the fourth consensus group, positive responses to the second prepare-transaction request; and
retrying the second transaction using a third prepare-transaction request comprising a third transaction number, wherein the third transaction number is higher than the second transaction number.

10. The method as recited in claim 5, further comprising:
sending, from a second proposer to at least a portion of a third consensus group and at least a portion of a fourth consensus group, a second prepare-transaction request for a second transaction, wherein the third consensus group comprises a third plurality of members and the fourth consensus group comprises a fourth plurality of members, wherein the second proposer and the third plurality of members and the fourth plurality of members implement the consensus protocol;
sending, from a majority of the third consensus group and a majority of the fourth consensus group to the second proposer, positive responses to the second prepare-transaction request, wherein the majority of the third consensus group and the majority of the fourth consensus group represent acceptors, and wherein the positive responses to the second prepare-transaction request from the third consensus group and from the fourth consensus group indicate acceptance of a third transaction having a higher transaction number than the second transaction; and
sending, from the second proposer to the acceptors in the third consensus group and in the fourth consensus group, an accept-transaction request for the third transaction.

11. The method as recited in claim 5, further comprising:
sending, from a second proposer to at least a portion of a third consensus group and at least a portion of a fourth consensus group, a second prepare-transaction request for a second transaction, wherein a transaction group for the second transaction comprises the third consensus group and the fourth consensus group;

determining, based at least in part on one or more responses to the second prepare-transaction request, that an additional transaction has been chosen by the third consensus group or the fourth consensus group, wherein the additional transaction involves another transaction group comprising one or more additional consensus groups; and sending an abort-transaction request from the second proposer to one or more consensus groups of the transaction group that returned responses to the second prepare-transaction request that indicate acceptance of one or more other transactions within a same scope as the transaction group.

12. The method as recited in claim 5, further comprising:

receiving, at a member of a consensus group within a transaction group, an abort-transaction request; and aborting, at the member of the consensus group, one or more accepted transaction proposals.

13. The method as recited in claim 5, wherein the plurality of stored replicas comprise volume data or volume metadata.

14. A computer-readable storage medium storing program instructions computer-executable to perform:

sending, from a proposer to at least a portion of a first consensus group and at least a portion of a second consensus group, a prepare-transaction request for a transaction, wherein the first consensus group comprises a first plurality of members and the second consensus group comprises a second plurality of members, wherein the proposer and the first plurality of members and the second plurality of members comprise servers having access to storage resources storing respective replicas of a same data set and implement a consensus protocol;

sending, from a majority of the first consensus group and a majority of the second consensus group to the proposer, positive responses to the prepare-transaction request, wherein the majority of the first consensus group and the majority of the second consensus group represent acceptors of the transaction, and wherein the positive responses to the prepare-transaction request do not indicate acceptance of an additional transaction;

sending, from the proposer to the acceptors in the first consensus group and in the second consensus group, an accept-transaction request for the transaction; and performing the transaction using the first plurality of members in the first consensus group and the second plurality of members in the second consensus group.

15. The computer-readable storage medium as recited in claim 14, wherein the prepare-transaction request, the positive responses to the prepare-transaction request, and the accept-transaction request are sent using a consensus protocol and without centralized coordination external to the proposer and the first and second consensus groups.

16. The computer-readable storage medium as recited in claim 14, wherein the prepare-transaction request comprises a transaction number, and wherein the program instructions are further computer-executable to perform:

determining an agreement, by the majority of the members in the first consensus group, to perform the transaction, wherein the transaction is selected from a plurality of proposed transactions involving the first consensus group based at least in part on the transaction number for the transaction being higher than the respective transaction numbers for additional transactions in the plurality of proposed transactions.

17. The computer-readable storage medium as recited in claim 14, wherein the prepare-transaction request comprises data identifying individual members in the first and second consensus groups to which the prepare-transaction request is sent.

18. The computer-readable storage medium as recited in claim 14, wherein the program instructions are further computer-executable to perform:

sending, from a second proposer to at least a portion of a third consensus group and at least a portion of a fourth consensus group, a second prepare-transaction request for a second transaction, wherein the second prepare-transaction request comprises a second transaction number, wherein the third consensus group comprises a third plurality of members and the fourth consensus group comprises a fourth plurality of members, wherein the second proposer and the third plurality of members and the fourth plurality of members implement the consensus protocol;

sending, from a majority of the third consensus group to the second proposer, but not from a majority of the fourth consensus group, positive responses to the second prepare-transaction request; and retrying the second transaction using a third prepare-transaction request comprising a third transaction number, wherein the third transaction number is higher than the second transaction number.

19. The computer-readable storage medium as recited in claim 14, wherein the program instructions are further computer-executable to perform:

sending, from a second proposer to at least a portion of a third consensus group and at least a portion of a fourth consensus group, a second prepare-transaction request for a second transaction, wherein a transaction group for the second transaction comprises the third consensus group and the fourth consensus group;

determining, based at least in part on one or more responses to the second prepare-transaction request, that an additional transaction has been chosen by the third consensus group or the fourth consensus group, wherein the additional transaction involves another transaction group comprising one or more additional consensus groups; and sending an abort-transaction request from the second proposer to one or more consensus groups of the transaction group that returned responses to the second prepare-transaction request that indicate acceptance of one or more other transactions within a same scope as the transaction group.

20. The computer-readable storage medium as recited in claim 13, wherein the program instructions are further computer-executable to perform:

sending, from a second proposer to at least a portion of the first consensus group and at least a portion of the second consensus group, a second prepare-transaction request for a second transaction;

determining, based at least in part on one or more responses to the second prepare-transaction request, that the transaction has been chosen by the first consensus group and the second consensus group; and initiating, by the second proposer, a redrive of the transaction using the first consensus group and the second consensus group.

* * * * *